Nov. 5, 1968  J. R. DECKER  3,408,701
CLIP FOR FISHING LINE
Filed Aug. 23, 1966

INVENTOR.
JOHN R. DECKER
BY
*Hanson and Lane*
ATTORNEYS

United States Patent Office 3,408,701
Patented Nov. 5, 1968

3,408,701
CLIP FOR FISHING LINE
John Richard Decker, 5710 Harder St.,
San Jose, Calif. 95129
Filed Aug. 23, 1966, Ser. No. 574,378
6 Claims. (Cl. 24—73)

ABSTRACT OF THE DISCLOSURE

A fishing clip of plastic material of a type, for example, acetate, which is tough, resiliently bendable, resists fatigue, and has a definite, ascertainable tear or break-away strength when stressed beyond its elastic limit. The clip comprises a body portion with two holes in it, one to receive a fishing line and one to receive the attaching eye of a sinker or other item to be attached by the clip to such line. A first slit in the body, of less thickness than the material from which an eye to be used with the clip is made, communicates the hole in the body for the eye with a lateral edge of the body at a point remote from the hole for the eye by a distance greater than the internal diameter of such eye. This first slit is spaced throughout its length from an edge of the body by a distance not greater than the internal diameter of the smallest eye to be used therewith so as to form a tongue insertible in such eye. A second slit of less width than the thickness of a fishing line to be used with the clip communicates the hole for the line with a lateral edge of the clip, either directly or via the hole for the eye. One of the holes is spaced at a selected minimum distance from an edge of the body, the plastic material of the body along said minimum distance comprising a breakaway zone which will fracture when subjected to a known tensile stress exerted between a fishing line in its hole and an eye in its hole in the clip.

---

An object of the present invention is to provide an improved, simplified, one piece plastic clip for attaching a sinker or other item to a fishing line.

Another object is to provide a plastic clip for attaching a sinker or other item to a fishing line, said clip comprising a small blank of plastic material, preferably clear acetate, having two spaced apart holes therein, with slits communicating each hole with an edge of the blank.

Another object of the invention is to provide such a clip which is so proportioned, and in which the holes, and the slit or slits communicating the holes with an edge of the clip, are so located and arranged as to make the clip substantially weedless and resistant to being inadvertently sprung open by a twisting or misalignment of a fishing line or other item attached to the clip.

Another object is to make such a clip of clear acetate plastic wherein the thickness of the plastic and the location of at least one of the holes therein provides a known breakaway strength for the clip.

The foregoing objects and advantages of the invention will be apparent from the following description and the accompanying drawings wherein.

Figure 1:
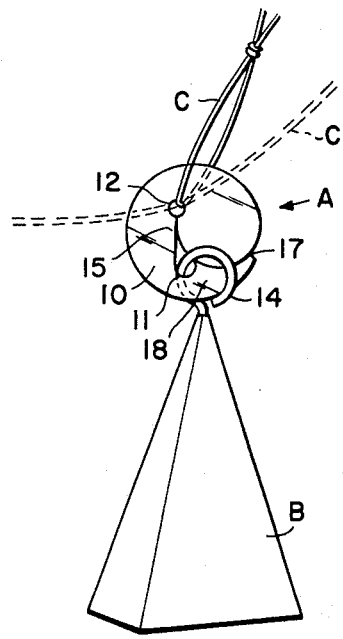
FIG. 1 is a side elevational view of a clip embodying the invention employed to fasten a sinker to a fishing line, the sinker being shown turned about its upright axis from a normal suspended condition to show how the clip structure prevents the attaching eye of the sinker from becoming accidentally detached in the event that it is so turned during use.
Figure 2:
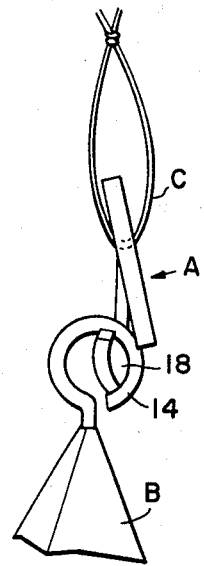
FIG. 2 is an enlarged edge view of the clip shown in FIG. 1 as it appears when a lower spur portion of the clip below a slit therein is manually twisted to open the slit to attach or detach a sinker or other item.
Figure 3:
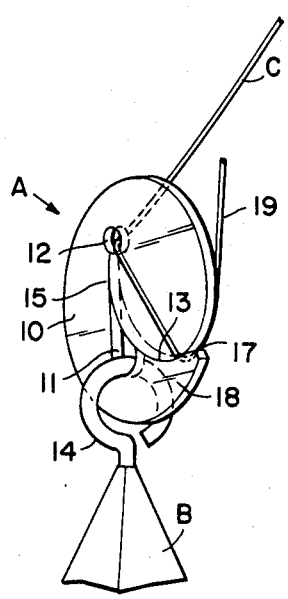
FIG. 3 is a perspective view of the clip shown in FIGS. 1 and 2 showing how the clip structure causes a fishing line to cam free when looped so as to enter the notch.

In the illustrative preferred form of the invention shown in FIGS. 1–3 a clip A is made of a blank 10 stamped from a sheet of plastic sheet material. Obviously, the clip can be made of molded plastic if preferred, but the present disclosure shows only the sheet plastic form. The plastic material from which the clip A is made preferably is tough and resiliently bendable, resists fatigue, has a definite, ascertainable uniform tear or break-away strength when stressed beyond its elastic limit, and is clear so as to be invisible or substantially so when submerged in water. Clear acetate plastic satisfies all of these requirements.

The blank 10 has a pair of holes 11 and 12 therein with at least one of these holes spaced a selected distance from a selected edge of the clip, whereby the clip will have a known or predetermined break-away strength. By making the clip A with a break-away strength less than that of a fishing line with which it is to be used, in the event that a sinker B or other item attached to a fishing line C by the clip A should become snagged, the line can be pulled free of such sinker or other item by pulling on the line to break the clip and save the line. Under this and other normal uses of the invention, the acetate or other suitable plastic material used in making the clip A has no tendency to cut or damage the usual monofilament line widely used by today's fishermen, and is freely slidable thereon.

The two holes 11 and 12 in the clip A are in spaced apart relation, and a narrow first slit 13 of a width less than the thickness of a fishing line or attaching eye to be passed therethrough communicates the lower hole 11 with a lateral edge of the clip.

The holes 11 and 12 are relatively small as compared to the size of the blank 10, so that the clip A will be sufficiently rigid to prevent ordinary working stresses imposed thereon during use from springing apart the edge portions defining the slits, which would tend to cause accidental release of a fishing line C or the attaching eye 14 of a sinker B or other item from their respective holes.

A second slit 15 in the blank 10 communicates the two holes 11 and 12 with each other so that a fishing line C can be passed initially through the first slit 13 into the lower hole 11 and thence through the second slit 15 into the upper hole 12. The edge portions of the blank defining the outer end of the first slit 11 diverge at their outer ends to provide a small notch 17 which facilitates the insertion of a fishing line C or item attaching means such as the sinker eye 14 into the slit. By making this notch 17 small, and spaced inwardly slightly from the widest portion of the blank 10, weeds through which the clip may be drawn are cammed aside and do not tend to catch on the point of the spur 18.

In order to prevent the attaching eye 14 of a sinker or other item from twisting free of the clip A, the first slit 13 is of a length greater than the diameter of the largest attaching eye 14 for which the clip is intended, and the distance from the bottom of the blank 10 to the lower slit 13 is less than the internal diameter of the smallest attaching eye to be passed through this slit. By this structure in the event that the sinker B or other item attached to the clip A by an attaching eye 14 should be turned or twisted relative to the clip as in casting, trolling or other use to the position shown in FIG. 1, the eye will engage the upper portion of the clip above the slit 13 which resists further twisting of the eye, while the length of the spur portion 18 of the clip below the first slit 13 prevents the free end of the spur from entering the eye and thus becoming detached.

It will be noted that the first slit 11 curves upwardly toward its outer end. The purpose of this curvature is to prevent a loop in the line from becoming fouled in the slit which would tend to release the clip from the line. As shown in FIG. 3, in the event that such a loop 19 should enter the notch 17, when tension is thereafter exerted on the line C the loop will cam itself free instead of entering the slit and thus will prevent detachment of the clip A from the line C.

In using the clip A, a clip is selected of a desired size and with desired break-away strength relative to the strength of the line on which it is to be used. The spur 18 is twisted to one side as shown in FIG. 2 and the line C is passed through the thus opened slits 15 and 13 into the upper or line receiving hole 12. The attaching eye 14 of a sinker or other item is then inserted through the first slit 13 into the lower hole 11 and the line, clip and sinker or other item attached to the clip are ready for use.

In the event that the clip A is designed to have a known or predetermined break-away strength, one or both of the holes 11 and 12 are located a selected distance from a selected edge of the blank 10. This selected distance, the thickness of the clip material and the diameter of the break-away hole are all factors in determining the break-away strength of the clip. The diameter of the break-away hole is a factor because the stress exerted by the line C or attaching eye 14 on the edge portion of the clip defining such hole acts through a lever arm equal to approximately the radius of the hole. The measurements required for a desired break-away strength for a material of selected or known break-away or tear strength may either be calculated by any competent engineer, or may be determined by cut-and-try methods.

Figure 4:
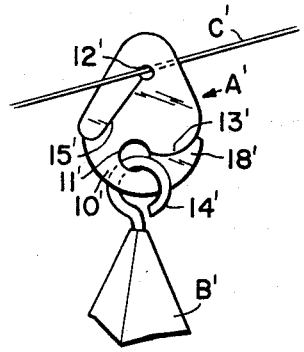
FIG. 4 is a side elevational view of a modified form of clip embodying the invention.

In the modified form of the invention shown in FIG. 4 a clip A' is shown which differs from clip A of FIGS. 1–3 principally in that it has a separate slit communicating each hole with an edge of the clip. This clip A' is otherwise generally similar to the clip A of FIGS. 1–3, and corresponding parts of clip A' are designated by the same reference numerals as those of clip A of FIGS. 1–3 with the prime (') added. Since the structure and operation of the modified clip A' will be obvious to one having an understanding of clip A no detailed description thereof is required.

While intended primarily for use in attaching a sinker to a fishing line, either of the clips A or A' may also be used for attaching a leader, artificial lure or other item (not shown) to such line. In the case of a sinker, the cost of which is negligible, the break-away strength of the clip should preferably be less than the strength of a fishing line with which the clip is to be used. When the clip is used for attaching a lure, however, the user might elect to risk all in attempting to utilize the maximum strength of his fishing line, and in such case may select a clip A having a break-away strength equal to or greater than the strength of his line.

The invention provides a simple, extremely inexpensive and highly satisfactory clip for use in attaching a sinker or other item to a fishing line, and one which can be rapidly and inexpensively either stamped out from sheet plastic or molded from plastic material at extremely high speed with very simple dies. A further important feature of the invention is that an accurate break-away strength can be readily provided, and the break-away strength of different sinkers from the same plastic material can be varied either by changing the thickness of the blank in the break-away zone, the size of the break-away hole employed, or the distance of such hole from a selected edge of the clip. By employing clear acetate plastic as the material from which the clips are made the clips will have all of the advantages referred to herein including those of sliding freely and without damage to the line, and invisibility or substantial invisibility in the water.

While I have illustrated and described a preferred embodiment of the present invention it will be understood, however, that various changes and modifications may be made in the details thereof without departing from the scope of the invention as set forth in the appended claims.

I claim:

1. A clip for attaching to a fishing line a sinker or other item having an attaching eye thereon, the attaching eye and fishing line each being of known diameter, said clip comprising
    a blank of a plastic material which is tough, resiliently bendable, resists fatigue, and has a definite, ascertainable tear or break-away strength when stressed beyond its elastic limit, the blank having two holes therein of small size relative to the size of the blank and spaced apart in the direction the clip travels when drawn through the water when in use, one of said holes being for receiving the fishing line, and the other thereof being for receiving an attaching eye,
    there being a slit in said blank of less width than the diameter of such fishing line and an attaching eye extending from each hole and communicating said holes with a lateral edge of the blank relative to the direction the clip travels when drawn through the water.

2. A clip as claimed in claim 2 wherein one of the slits communicates one of the holes with a selected lateral edge of the clip, and the other slit communicates the two holes with each other.

3. A clip as claimed in claim 1 wherein the slit communicating the hole for receiving the attaching eye with an edge of the blank separates an elongated, integral spur portion from the remainder of the blank, the spur portion being of a width less than the internal diameter of the smallest attaching eye to be introduced through the latter slit, and of a greater length than the internal diameter of the largest such attaching eye.

4. A clip as claimed in claim 1 wherein the edge portions of said blank defining one of the slits diverge adjacent the edge of the blank toward which said one slit extends to provide a notch to facilitate introducing a fishing line or other element into and through the slit into the hole from which such slit extends and wherein the outer end portion of said one slit curves forwardly relative to the direction of passage of the clip travels when drawn through the water with sufficient curvature to cam free any looped portion of the fishing line entering the notch.

5. A clip as claimed in claim 1 wherein the blank has sufficient initial resilience to permit the edge portions of the blank defining each slit to be sprung apart upon a transverse twisting of the blank sufficiently to admit such fishing line and attaching eye through such slits without fracturing the blank, the diameter of at least one of the holes and, the distance of such one hole from the nearest edge of the blank providing a break-away zone which will fracture and release the eye from the line when said zone is subjected to a tensile stress of known magnitude exerted between a fishing line inserted in one of the holes and an attaching eye inserted in the other hole.

6. A clip as claimed in claim 5 wherein the blank is of acetate plastic.

References Cited

UNITED STATES PATENTS

| | | | |
|---|---|---|---|
| 1,304,417 | 5/1919 | Underwood | 40—20 |
| 1,546,430 | 7/1925 | Blitz | 24—230.5 |
| 1,821,377 | 9/1931 | Cusick | 24—3.1 |
| 2,783,515 | 3/1957 | Tobias | 24—129.2 |
| 2,884,735 | 5/1959 | Ticer | 43—43.12 |
| 3,280,498 | 10/1966 | Decker | 43—43.12 |

DONALD A. GRIFFIN, *Primary Examiner.*